Jan. 31, 1967   L. A. POWERS   3,300,796
PONTOON BOAT AND TRAILER THEREFOR
Filed Aug. 6, 1964   3 Sheets-Sheet 1

INVENTOR
L. A. Powers

BY *Thomas A. Harwood*

ATTORNEY

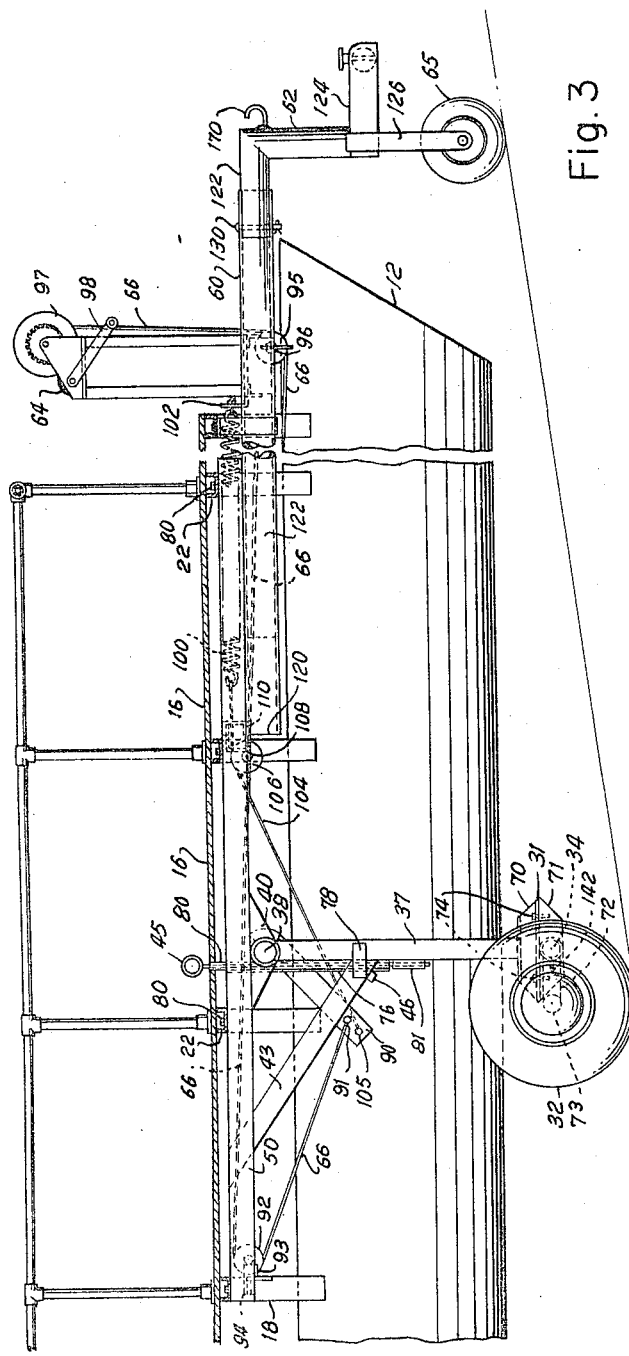

Jan. 31, 1967   L. A. POWERS   3,300,796
PONTOON BOAT AND TRAILER THEREFOR
Filed Aug. 6, 1964   3 Sheets-Sheet 3

INVENTOR
L. A. Powers
BY Thomas R. Harwood
ATTORNEY

United States Patent Office 3,300,796
Patented Jan. 31, 1967

3,300,796
PONTOON BOAT AND TRAILER THEREFOR
L. A. Powers, 4136 Warbler St., Dallas, Tex. 75227
Filed Aug. 6, 1964, Ser. No. 387,969
1 Claim. (Cl. 9—1)

This invention relates generally to boats and boat trailers, and more particularly to an amphibious pontoon boat and a trailer for being attached thereto to provide an amphibious vessel which requires no loading or unloading of the pontoon boat on or off the trailer during launching or loading.

The pontoon boat is becoming increasingly popular as a vessel for fishing, primarily for the reason that it provides a large stable floating platform that allows fishermen ample space. Unlike conventional inboard and outboard boats, however, the pontoon boat is not easily loaded onto a trailer or removed therefrom, primarily because of its large weight and massive size. Moreover, standard boat trailers can not be used, and difficulty is encountered in towing pontoon boats across land even with specially designed trailers. Although trailer systems have been devised for towing pontoon boats on land, great difficulty is encountered in the loading and/or unloading the pontoon boat from the trailer. In fact, most of these trailers must be completely submerged beneath the water since the pontoon boat is too heavy to raise up, thus increasing the difficulty of seeing what the operator is doing. In addition, the operation invariably requires the combined efforts of several persons.

Amphibious vessels have, of course, long been in use, which obviates the necessity of loading and unloading a vessel from a trailer. Most of these vessels, however, are specially designed, have permanently fixed wheels and are not constructed as a trailer for being adapted to any other use. The problem to which this invention relates is the need for making the pontoon boat mobile on land and facilitating the launching and loading thereof, yet also allowing the boat to be used in water without the removal of the trailer portion which lends it mobility. It will be recognized that once the pontoon boat is launched, the trailer wheels should be retracted to reduce drag and allow the boat to navigate in shallower waters. All of this is desirably accomplished with a minimum of effort, such as can be exerted by a single operator. Moreover, it is desirable that such a trailer be so designed as to be readily adaptable to a conventional pontoon boat with little, if any, modification of the boat, all as provided by the invention as set forth in the following paragraphs.

The present invention provides a trailer adapted to be attached to a pontoon boat to give it an amphibious character so as to require no loading and unloading of the boat from the trailer. Briefly, the trailer comprises a frame to which are attached a pair of retractable wheels on which the pontoon boat is towed across land and which are used to aid in the launching and loading of the boat into and from the water. The trailer also includes a third retractable wheel attached to a telescoping hitch tube located at the front of the trailer, which front wheel is used only in the launching and loading of the boat. Moreover, a trailer hitch is provided on the hitch tube for connecting the boat to a towing vehicle. The trailer system of the invention is characterized in its simplicity of operation and design, wherein a single person can load or launch the boat without any difficulty or exerting himself to an undue extent. This is made possible by the fact that the trailer is so constructed that when all three wheels are in the "down" position, the pontoon boat is driven partly onto the loading ramp or beach by the outboard motor on the pontoon boat. The relative orientation of the wheels in relation to the pontoons of the boat and the water level is such that the boat remains in a position of approximately half on and half off the loading ramp, so that the operator then backs the towing vehicle to the trailer hitch, attaches it and drives off with the boat. The reverse procedure is used during the launching of the boat. During use of the boat in the water, all three wheels are retracted out of the water to eliminate any drag, whereby the mechanism for raising and lowering the wheels can be operated by one person. The trailer can be built as an integral part of a pontoon boat or can be made as a separate unit to be attached by simple means to the boat. In either case, the trailer is so constructed that it is readily adapted to a conventional pontoon boat with little, if any, modification to the boat, wherein all of the retractable wheels can be controlled from the top of the boat deck.

Many other advantages and features of the present invention will become apparent from the following detailed description of a preferred embodiment thereof when taken in conjunction with the appended claims and the attached drawing wherein like reference numerals refer to like parts throughout the several figures, and in which:

FIGURE 3 is an elevational view in section taken across section lines 3—3 of FIGURE 1 showing the wheels in the down position and illustrating the detailed construction of the trailer;

FIGURE 4 is an elevational view in section taken across section lines 4—4 of FIGURE 2 with the wheels in the up position;

Figure 1:
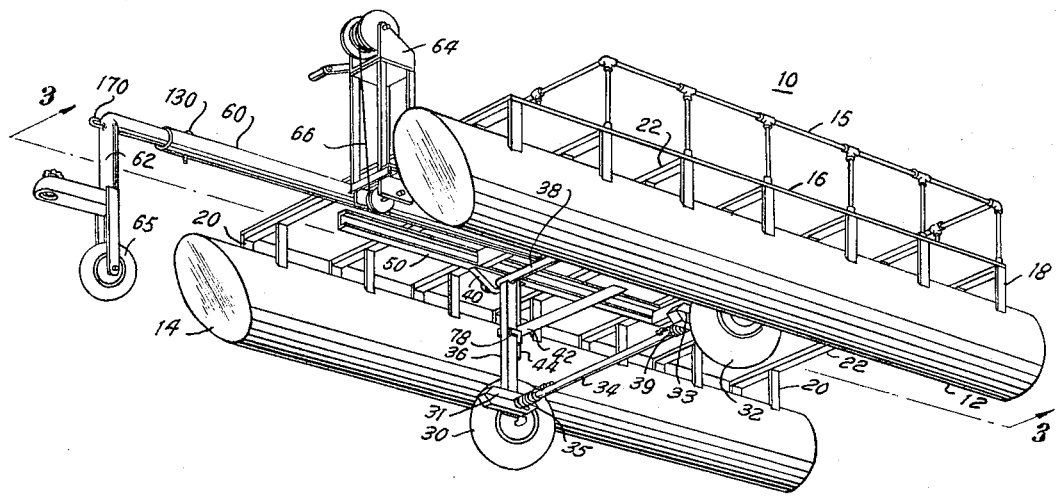
FIGURE 1 is a perspective view of the trailer of the invention attached to a pontoon boat with the retractable wheels lowered to the down position for launching, loading and/or towing.

Referring now to FIGURE 1, there is shown a pontoon boat 10 of conventional construction which includes a pair of parallel elongated pontoons 12 and 14 constructed of metal, Fiberglas or other structural materials to form air-tight tanks. The floor or deck 16 is supported by means of a plurality of spaced-apart, transverse joists 22 under the deck, wherein the joists are rigidly attached at their two ends to a plurality of vertical braces 18 and 20, respectively. The braces are spaced along the sides of the deck coinciding to the joists and all rigidly attached at their lower ends to the pontoons. Three rows of braces are normally provided for each pontoon and are attached along opposite sides thereof to ensure the structural rigidity of the pontoons relative to the deck. Usually an enclosure or railing 15 is provided about the perimeter of the floor 16, and the pontoon boat is normally powered by a standard outboard motor (not shown) attached at the rear of the deck between the two pontoons.

FIGURE 1 also illustrates the trailer of the invention when it is attached to the pontoon boat, with the retractable wheels being shown in the down position. The trailer comprises a pair of main wheels 30 and 32 rotatably attached to the opposite ends of a torsion bar 34, whereby the bar 34 passes through and is supported by bearings 31 and 33 just inside the wheels 30 and 32, respectively. The bearings 31 and 33 are supported by and rigidly attached to wheel struts, wherein a wheel strut 36 is shown attached to bearings 31 and the other strut is hidden from view by pontoon 12. The wheel struts are rigidly attached to a transverse bar 38 which is rotatably supported within bearing 40 on one side and a similar bearing on the other side, not shown, with the bearings being rigidly attached to a frame member 50. Immediately inside the bearings 31 and 33 are coil springs 35 and 39 wound about bar 34, which are provided for absorbing shock which would otherwise be transmitted to the boat as it is towed on land. To further absorb shock, the transverse bar 34 acts as a torsion bar, thus permitting the wheels to move up and down similar to automobile wheels. When the two main wheels are in the down position, as shown, they are braced in this position by a fixed brace bar 42 located immediately behind wheel strut 36 and a similar brace, not shown, located behind the wheel strut of wheel 32. A safety lock pin 44 is then inserted from the top of the deck 16 to lock the wheel strut 36 against the brace 42 to insure that the wheel cannot retract when the boat is being towed. Another pin locks the other wheel, all as will be shown in detail hereinafter. The wheel struts, braces, rods and axles, including their respective bearings, are all supported from a general frame member 50, as will be shown in detail hereinafter, whereby the trailer is adapted to a pontoon boat by bolting the frame member 50 to the floor joists of the boat.

The trailer also comprises a tongue or tube 60 projecting out in front of the boat with a hand winch 64 positioned above and attached to the tube. The tube is open at the front end into which is telescoped a hitch tube 62 and front wheel 65, which can be telescoped in and out of the tube 60 and rotated within the tube to retract or lower the front wheel 65. Normally, the front wheel 65 is locked in a down position when the main wheels 30 and 32 are in their down position, so that the three wheels cooperate in providing a trailer which may be loaded or launched very easily. The hand winch is used to raise and lower the main wheels in cooperation with a spring (not shown) and will be described in detail in conjunction with FIGURES 3 and 4.

Figure 2:
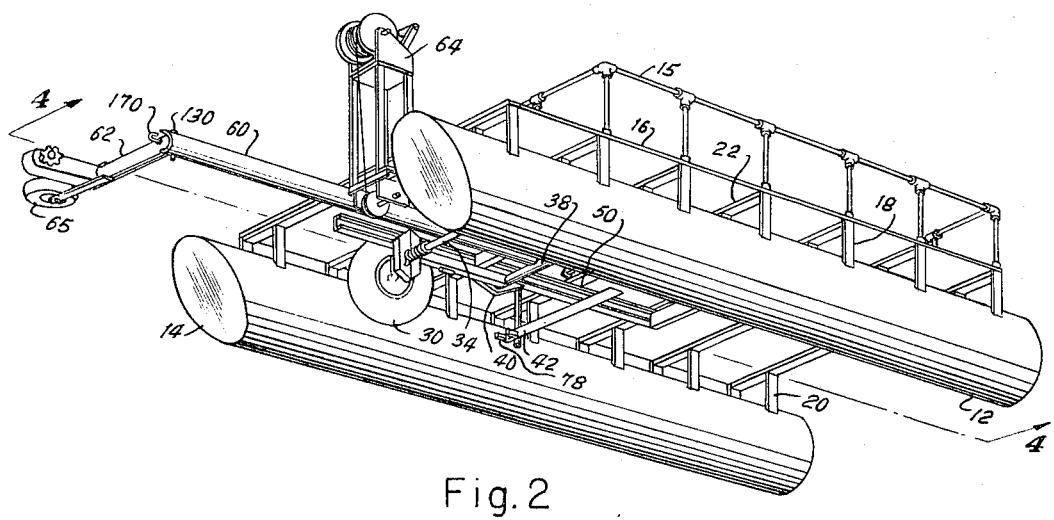
FIGURE 2 is a perspective view of the trailer of the invention attached to a pontoon boat with the retractable wheels raised to the up position during use of the boat on water.

After the boat is launched, all three wheels are retracted as shown in FIGURE 2. This is done by removing the safety lock pins and releasing the hand winch 64. In so doing, a spring or other resilient means retracts the two main wheels when a cable 66 on the winch is let out. The front wheel is locked in a down or up position by a pin 130 which is simply removed when the front wheels are to be rotated up or down and replaced to lock it in either position. In order to lower the main wheels to their down position, the hand winch 64 is turned to reel in cable 66, and by suitable lever means, acted on by cable 66, the wheels are brought to their down position where they are locked by the safety lock pins. From FIGURE 1, it can be seen that the main wheels project below the pontoons in their down position for towing, but are well above the bottom of the pontoons in their retracted position. In fact, the wheels do not touch the water in the retracted position. The front wheel is lowered for loading and launching of the trailer and projects slightly below the pontoons in its lowered position as more clearly seen in FIGURE 3, although the front wheel in the lowered position is not as low as the main wheels. The reason for this is so the front wheel will be above ground level when the boat is being towed. The location of the main wheels, in their down position, is such as to approximately balance the entire boat at its center of gravity.

Figure 5:
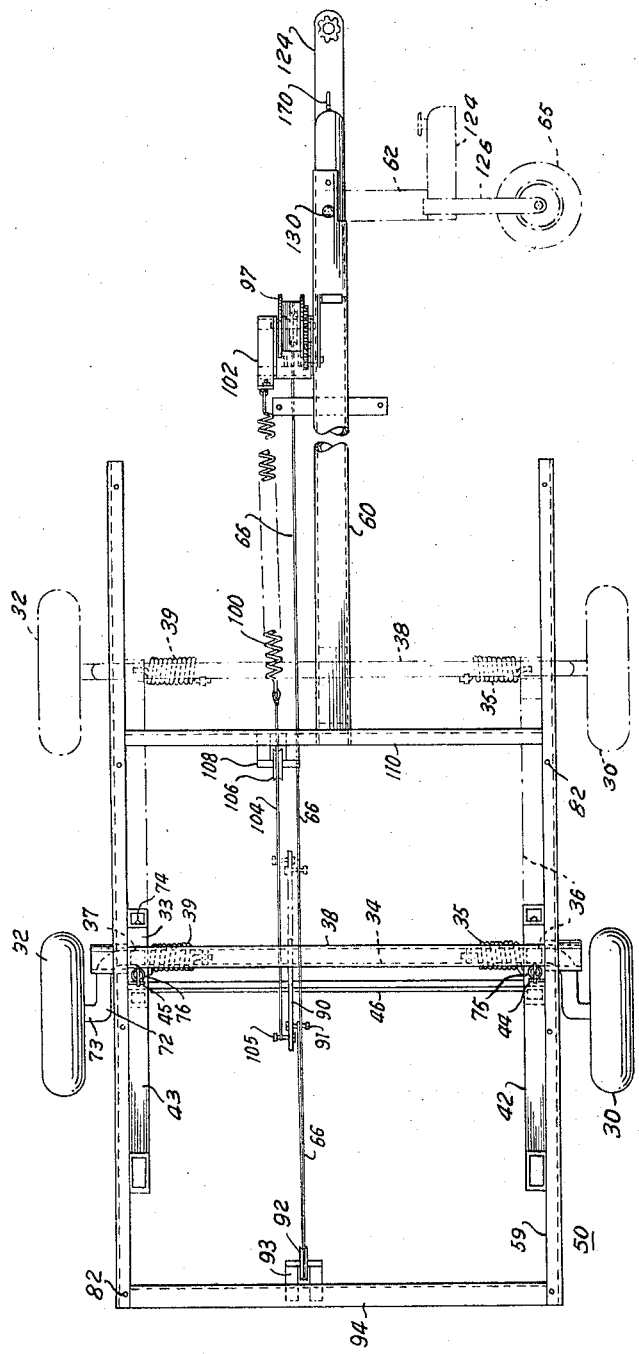
FIGURE 5 is a top plan view of the trailer showing the wheels in the down position in solid lines and showing the wheels retracted to the up position by the dashed lines.

Referring now to FIGURES 3 and 4, which are sectional views in elevation taken along section lines 3—3 and 4—4 of FIGURES 1 and 2, respectively, the construction of the trailer which is attached to the boat can be seen in more detail in conjunction with the following description. FIGURE 3 shows the trailer construction when the wheels are in their down position and shows only wheel 32, which is located on the left side of the boat when facing forward. In describing the construction of the trailer in conjunction with FIGURES 3 and 4, it will be helpful to refer to FIGURE 5 which is a top plan view of the trailer. The wheel 32, and similarly wheel 30, is carried on a torsion bar 34 which is generally U-shaped and bent 90° close to its end 72 and again bent 90° parallel to bar 34 at its very end 73, whereby the wheel 32 is carried on the end 73 through suitable bearing. The torsion bar 34 passes through and is supported by axle bearings on either side, such as bearing 31 located just inside wheel 32 and a bearing 39 located just inside wheel 30. Each of these bearings, such as bearing 31, for example, comprises a lower bearing half 71 and an upper support half 70 for attaching the bearing to the wheel strut 37, with the torsion bar passing through the lower half 71. The bearing 71 and support member 70 are bolted together by bolts 74 with the upper half 70 being welded or secured to a wheel strut 37. The wheel strut 37, and similarly the other wheel strut for wheel 30, is rigidly attached or welded to an axle 38, wherein the axle passes through bearings on either side of the trailer, such as bearing 40 located just outside of wheel strut 37. The bearing 40 is welded to a main frame member 50 of the trailer, wherein the bearing 40 simply comprises a steel member having a sleeve positioned in a hole therethrough with the axle, which comprises a pipe, passing therethrough. Also attached at one end to the axle 38 in rigid relationship therewith is a lever 90 located intermediate of the wheel struts but just off center, as shown in FIGURE 5. Since both the wheel struts and lever 90 are rigidly attached to the axle 38, any motion of the lever tending to rotate the axle 38 tends to rotate the wheels by means of the wheel struts in the same direction. Attached to the other end of lever 90 by means of a suitable rod or bolt 91 is a flexible steel cable 66 which passes over a pulley 92 located behind the lever. The pulley 92 is attached by means of a bracket 93 to an angle iron bracket support 94, the latter of which forms the transverse rear member of the main frame 50. Cable 66, after passing over pulley 92, runs the length of the trailer toward the front thereof where it is connected to the hand winch 64. As shown more clearly in FIGURE 5, the hand winch 64 is attached to the side of tube 60, with the tube being welded or bolted to a short transverse support member 52 intermediate its length and a transverse frame member 110 at its rear end, the latter of which is connected and forms a part of the main frame 50. The hand winch includes a lower pulley 95 supported in bracket 96 attached to the winch, as shown more clearly in FIGURE 3, and a larger upper cable drum or axle 97. Cable 66 is passed beneath pulley 95 and over the drum 97 so that it can be reeled in and out as desired.

Also attached to the lower end of lever 90 by means of a bolt or pin 105 is another flexible cable 104 which is passed over a pulley 106 held in a bracket 108, the latter of which is rigidly attached to the front transverse frame member 110 to which the rear end of tube 60 is attached. On the front side of the pulley 106, the cable 104 is attached to one end of a spring or resilient member 100, and the other end of the spring is attached to a bracket 102, with the bracket 102 being attached to the bottom support of the hand winch. The main wheels 30 and 32 are retracted by means of the spring 100, as more clearly shown in FIGURE 4 and in the dashed lines of FIGURE 5, when the safety lock pins are removed and the hand winch is loosened and turned in the reverse direction. The retracting force is provided by the tension spring collapsing to shorten its length and pulling on cable 104, the latter of which acts on the bottom of lever 90 to transmit a torque to the axle 38. This causes the wheels to be retracted to an up position just beneath the floor or platform 16 of the pontoon boat. The wheels will remain in this position by the compression action of spring 100 until the hand winch is used to lower them.

To lower the main wheels, the hand winch handle 90 is turned so as to reel in cable 66 on drum 97. In so doing, the cable 66 produces a force on the end of lever 90 rearwardly which causes the wheels to be rotated downward about axle 38. The wheels are rotated downward until the wheel struts supporting the two wheels come to rest in a vertical position against support brackets rigidly attached to the main frame member 50. Each strut has a support bracket against which it rests, although only the support bracket for wheel 32 and strut 37 is shown in the sectional views of FIGURES 3 and 4. The support bracket for strut 37 comprises a member 43 attached at an angle to the frame member 50 and extending down to abut the wheel strut when the strut is in a vertical position. Rigidly attached to the end of member 43 is a vertical bar 76 which is also attached at its top end to the main frame member 50, whereby the bar 76 defines a channel down its length to receive a lock pin. A similar support bracket is provided for wheel 30 and its related wheel strut, and a connecting bar 46 is rigidly attached between the two support members for further strength. Attached to the lower front end of member 43 is a clasp 78 for receiving the strut 36 between its springs when the wheel is brought down to a vertical position, so that the strut is guided and held against the support member 43. When the hand winch is cranked so that the wheels are forced down to a vertical position against the support brackets, safety lock pins, such as pin 45, for example, are inserted from the top of deck 16 through a guide 80 therethrough down into the channel of vertical bar 76 and into a tube 81 rigidly attached to the wheel strut 37, thus firmly securing the wheel strut 37 against the support bracket 43 and its clasp 78. As described previously, the wheels are retracted by removing the safety lock pins such as pin 45 and the related pin for wheel 30 and releasing the lock on the hand winch 64. The spring 100 then provides enough force either by itself or with very little effort in reverse turning of the hand winch to retract the wheels to their up position, where they are held in this position by the spring. The location of the main wheels in their down position is such as to approximately balance the load of the pontoon boat and trailer, so that the main wheel system carries the bulk of the load, rather than the towing vehicle.

Referring specifically to the top plan view of the trailer shown in FIGURE 5, the main frame member 50 can be more readily seen as comprising a pair of parallel side members 54 and 56 connected at the rear by member 94 and at the front by member 110. These members are preferably comprised of angle iron and are welded together. The bearings through which axle 38 is supported and rotates are welded, respectively, to the undersides of the side members 54 and 56, whereas the wheel struts and bearings 31 and 33 supporting the torsion bar 34 are supported from axle 38 and located just inside the frame members 54 and 56. The wheels and S-shaped ends 72–73 of torsion bar 34 which support the wheels are located just outside members 54 and 56. The coil springs 35 and 39 wound about torsion bar 34 just inside the two main wheels are secured at one end through a bracket 140, as shown in FIGURE 5, and at the other end within the housing of the axle bearing, such as by bracket 142 of the bearing part 71 as shown in FIGURE 3. Thus, as torsion bar 34 twists, the coil spring gives added resilience to absorb shock. The tube 60 is seen to be centered between members 54 and 56 and welded at its rear end to transverse frame member 110, the centering of this tube to which the trailer hitch is attached for towing purposes being apparent. So that the raising and lowering cables 66 and 104 do not conflict with tube 60, the lever 90 is attached at one end to the axle 38 just off center to one side of tube 60, with the spring 100 and winch 64 also being carried to one side of the tube. Holes 82 are provided in the main frame 50 along the side members 54 and 56, and dsimilarly, holes 84 are provided in the short transverse member 52 supporting the front end of tube 60 and winch 64, so that the entire trailer can be bolted beneath the pontoon boat against the joists 22 by bolts 80, as shown in FIGURES 3 and 4.

The front wheel 65 is carried at the end 62 of a hitch tube 122 which telescopes into tube 60. The front end 62 makes an angle of 90° to telescoping tube 122, as shown, and also has welded thereto a forwardly projecting trailer hitch 124. The tube 60, therefore, has an open front end into which tube 122 passes, and this front end defines only a half-tube back for a short distance. When the front wheel is in its down position, it is locked in place by a pin 130 passing through both tube 60 and tube 122. When the front wheel is raised to its up position, the front portion 62 of tube 122 is inserted between the side cut out of tube 60 defining a half-tube, which holds the front wheel and tube 62 in the horizontal position. The pin 130 is then passed through tube 60 in front of tube 62 to prevent tube 62 from slipping out of the groove.

Figure 6:
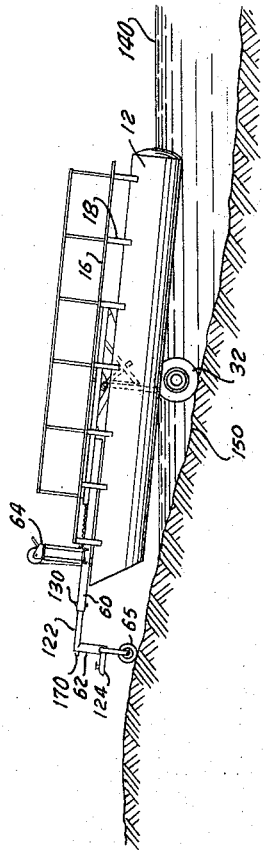
FIGURE 6 is a side elevational view of a pontoon boat to which the trailer is attached illustrating the orientation of the boat and trailer with respect to the water and loading ramp when launching or loading.

Reference is had to FIGURE 6, which is a side elevational view of the pontoon boat and attached trailer illustrating the ease with which the boat is launched, loaded and towed. In both launching and loading, all three wheels are lowered to the down position. If launching, these wheels are already in the down position, since the boat is being towed behind a vehicle, not shown. In loading, these wheels are lowered in the water before the boat is brought into the loading ramp. Then, the boat is driven partially onto the ramp or incline 150 by the outboard motor (not shown) attached to the rear of the boat. Because of the front wheel 65, the boat will easily ride part way onto the beach to a point where the boat is balanced by means of the front wheel, the two main wheels and the floating support given by the pontoons, as shown. The pontoons will clear the beach or ramp, since front wheel 65 extends slightly below the bottom of the pontoons. The operator then disembarks from the boat, backs the towing vehicle toward the trailer hitch, raises the front end of the trailer hitch by a slight amount, slips in onto the ball of the hitch attached to the towing vehicle, tightens it and drives off with the boat. It can be seen that when the trailer is attached to the towing vehicle, the boat will be horizontal with the front wheel clearing the ground. The reverse procedure is used for launching the boat, where all three vehicles are retracted once the boat is launched and completely floating in the water. When the towing vehicle cannot be backed down to completely meet the hitch tube for any reason, a cable hook 170 is provided on the front end of the hitch tube so that by connecting a cable between the towing vehicle and this hook allows the pontoon boat to be towed completely ashore for greater accessibility.

The various structural members of the trailer are preferably comprised of structural metal or steel, such as angle iron, structural channel and pipe. As examples, the main frame 50 is preferably made from structural channel, the axles and rods made from metal pipe or tubing, etc. However, any adequate structural members will suffice. The complete adaptability of the trailer to conventional pontoon boats is evident by means of merely bolting the frame 50 to the underside of the deck joists to provide a transformation of the pontoon boat from a vessel which must remain in the water, or one being very difficult to load onto a trailer, to a vessel which is amphibious in character. The trailer is also of simple design, yet provides the necessary features and cooperating parts to allow the operation of loading and launching to be easily performed by a single operator. Undoubtedly, many modifications and substitutions that do not depart from the true scope of the invention will occur to those skilled in the art, whereby it is intended that the invention be limited only as defined in the appended claim.

What is claimed is:

A trailer adapted for being attached to the underdeck of a pontoon boat having a pair of opposing pontoons along the two sides of the boat and a deck supported between said pair of pontoons, comprising:

(a) a main framework having a width less than the separation between said pair of opposing pontoons for being attached to the bottom of said deck with the front end thereof adapted to extend beyond the front edge of said deck;

(b) a transverse member attached to said main framework for rotation about an axis along its length;

(c) a pair of laterally spaced apart struts rigidly attached to said transverse member adjacent the respective ends thereof for movement between substantially vertical and horizontal positions responsive to the rotation of said transverse member;

(d) a pair of wheels attached to the ends of said pair of struts, respectively, spaced from said transverse member for movment with said pair of struts between a lower position with at least a portion thereof extending below the bottoms of said pair of pontoons and a raised position between said pair of pontoons above the bottoms thereof;

(e) a lever rigidly attached at one end to said transverse member that extends behind said pair of struts at an angle intermediate the horizontal and vertical when said pair of wheels are in said lowered position;

(f) winch means attached to the front of said framework extending beyond the front edge of said deck;

(g) a flexible cable coupled to said winch means and said lever for causing said transverse member to be rotated about said axis to move said pair of wheels to said lower position in response to said cable being taken up by said winch means;

(h) a pulley attached to said framework rearward of said lever over which said flexible cable passes;

(i) resilient means connected between said framework and said lever for urging said wheels toward said raised position and for holding said wheels in said raised position when said winch means is released; and (j) a front wheel retractably supported from said framework adapted to extend beyond the front edge of said deck for movement between a lower position with at least a portion thereof extending below said pair of pontoons and a raised position above the bottoms of said pair of pontoons.

References Cited by the Examiner

UNITED STATES PATENTS

| | | | |
|---|---|---|---|
| 2,194,594 | 3/1940 | Halley. | |
| 2,526,905 | 10/1950 | Sartin | 280—150.5 |
| 2,759,201 | 8/1956 | McKinney | 9—1 |
| 2,770,470 | 11/1956 | Halverson | 280—414 X |
| 2,810,588 | 10/1957 | Rozett | 280—414 X |
| 2,865,031 | 12/1958 | Maloney | 9—1 |
| 3,104,891 | 9/1963 | Dalton | 280—150.5 |
| 3,203,014 | 8/1965 | Krueger | 9—1 |
| 3,210,783 | 10/1965 | Petty | 9—1 |

MILTON BUCHLER, *Primary Examiner.*

T. M. BLIX, *Assistant Examiner.*